(12) United States Patent
Wang et al.

(10) Patent No.: US 10,396,923 B2
(45) Date of Patent: Aug. 27, 2019

(54) NETWORK CONFIGURATION (71) Applicant: Samsung Electronics Co., Ltd, Gyeonggi-do (KR)

(72) Inventors: Yue Wang, Middlesex (GB); Daniel Ansorregui Lobete, Middlesex (GB); Maziar Nekovee, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 15/615,658

(22) Filed: Jun. 6, 2017

(65) Prior Publication Data
US 2017/0353260 A1 Dec. 7, 2017

(30) Foreign Application Priority Data

Jun. 2, 2016 (GB) .................................. 1609692.7

(51) Int. Cl.
H04J 3/16 (2006.01)
H04B 7/024 (2017.01)
(Continued)

(52) U.S. Cl.
CPC ............ *H04J 3/1694* (2013.01); *H04B 7/024* (2013.01); *H04W 48/02* (2013.01); *H04W 72/04* (2013.01);
(Continued)

(58) Field of Classification Search
CPC ..... H04J 3/1694; H04W 72/04; H04W 76/04; H04W 16/24; H04B 7/024; H04B 7/0408
See application file for complete search history.

(56) References Cited

U.S. PATENT DOCUMENTS 8,849,306 B1 9/2014 McMullen et al.
9,735,901 B2 * 8/2017 Yoshizawa ............ H04W 36/04
(Continued)

FOREIGN PATENT DOCUMENTS

CN 103220751 A 7/2013
CN 103906076 A 7/2014
(Continued)

OTHER PUBLICATIONS

International Search Report dated Sep. 14, 2017 in connection with International Patent Application No. PCT/KR2017/005835.
(Continued)

*Primary Examiner* — Alex Skripnikov
*Assistant Examiner* — Sharmin Chowdhury (57) ABSTRACT The present disclosure relates to a pre-5$^{th}$-generation (5G) or 5G communication system to be provided for supporting higher data rates beyond 4$^{th}$-generation (4G) communication system such as long term evolution (LTE). Disclosed is a method of managing a telecommunications network, comprising the steps of: obtaining data representing an operational parameter from the at least one of a plurality of network elements comprising a plurality of base stations and at least one terminal, determining mapping information for connection between the at least one terminal and one of the plurality of base stations based on the data representing the operational parameter, and transmitting, to the at least one terminal, the mapping information.

20 Claims, 7 Drawing Sheets (51) Int. Cl.
*H04W 48/02* (2009.01)
*H04W 72/04* (2009.01)
*H04W 16/24* (2009.01)
*H04W 24/02* (2009.01)
*H04W 76/20* (2018.01)
*H04W 92/04* (2009.01)
*H04B 7/0408* (2017.01)

(52) U.S. Cl.
CPC ........... *H04B 7/0408* (2013.01); *H04W 16/24* (2013.01); *H04W 24/02* (2013.01); *H04W 76/20* (2018.02); *H04W 92/045* (2013.01)

(56) References Cited

U.S. PATENT DOCUMENTS

| | | |
|---|---|---|
| 2008/0298249 A1 | 12/2008 | Baker et al. |
| 2010/0177711 A1 | 7/2010 | Gum |
| 2010/0178916 A1 | 7/2010 | Jamadagni |
| 2010/0227613 A1* | 9/2010 | Kim .................. H04L 25/03828 455/434 |
| 2012/0002567 A1* | 1/2012 | Sun ...................... H04W 28/16 370/252 |
| 2012/0003987 A1 | 1/2012 | Vasudevan et al. |
| 2012/0329471 A1 | 12/2012 | Barta et al. |
| 2013/0021929 A1* | 1/2013 | Kim ...................... H04B 7/024 370/252 |
| 2014/0038634 A1 | 2/2014 | Eskicioglu et al. |
| 2014/0101312 A1* | 4/2014 | Huang .............. H04L 29/06469 709/225 |
| 2015/0180676 A1* | 6/2015 | Bao .................... H04L 12/1886 370/230 |
| 2015/0257169 A1 | 9/2015 | Zarifi et al. |
| 2016/0330643 A1* | 11/2016 | Sahin .................... H04W 16/14 |
| 2017/0188273 A1* | 6/2017 | Yiu .................. H04W 36/0094 |

FOREIGN PATENT DOCUMENTS

| | | |
|---|---|---|
| CN | 104955116 A | 9/2015 |
| WO | 2015047884 A1 | 4/2015 |
| WO | 2016072893 A1 | 5/2016 |

OTHER PUBLICATIONS

Witten Opinion of the International Searching Authority dated Sep. 14, 2017 in connection with International Patent Application No. PCT/KR2017/005835.

"Self-Optimizing Networks in 3GPP Release 11: The Benefits of SON in LTe," 4G Americas, Oct. 2013, 62 pages.

"5G: New Air Interface and Radio Access Virtualization," Huawei White Paper, Huawei Technologies Co., Ltd., Apr. 2015, 6 pages.

Boccardi, F., et al., "Five Disruptive Technology Directions for 5G," 5G Wireless Communication Systems: Prospects and Challenges, IEEE Communications Magazine, Feb. 2014, pp. 74-80.

Ye, Q., et al., "User Association for Load Balancing in Heterogeneous Cellular Networks," National Science Foundation and Huawei, Nov. 19, 2015, 24 pages.

Foreign Communication From a Related Counterpart Application, Great Britain Application No. GB1609692.7, Combined Search and Examination Report dated Nov. 18, 2016, 7 pages.

* cited by examiner

NETWORK CONFIGURATION

CROSS-REFERENCE TO RELATED APPLICATION(S) AND CLAIM OF PRIORITY

The present application is related to and claims the priority under 35 U.S.C. § 119(a) of United Kingdom patent application filed in the United Kingdom Intellectual Property Office on Jun. 6, 2016, and assigned Serial No. 1609692.7, the entire disclosure of which is hereby incorporated by reference.

TECHNICAL FIELD

The present disclosure relates to improvements in the manner in which mobile terminals or User Equipment (UE) associate with base stations (BS). In particular, 5G networks pose particular problems in this regard and the present disclosure addresses such problems.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" or a "post long term evolution (LTE) System."

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Traditional cellular networks are 'cell centric', in the sense that a user equipment (UE) is, in general, tied to one or multiple serving cells, as a consequence of being offered a highest signal to interference and noise ratio (SINR) by a given BS. As the UE approaches the cell edge of this BS, the link quality between the UE and the BS degrades significantly, due to the increased path loss and inter-cell interference (ICI). Such a degradation of link performance is a limiting factor in conventional cell-centric deployment, especially when the network is interference-limited.

5G networks, aiming to provide ubiquitous services to massive number of users, are designed to exploit densification at both network and user equipment levels. In particular, as one of the key technologies in 5G, network virtualization moves the focal point of the network from the cells to the UEs, resulting in the so-called 'device-centric' architecture. As opposed to a more traditional cell-centric network, a device-centric network focuses on the UE, which can be surrounded by a number of access points (referred to as base stations BS herein). From the network perspective, because the BSs are so densely deployed, ICI becomes a severe problem. On the other hand, because the UE now has multiple options in terms of which BS to connect to, there exists a problem of which BS the UE may associate with to achieve better performance for the entire network, bearing in mind the interference which could be caused as a result of a UE associating with one or a plurality of BSs.

Node association in a prior art cell-centric network is typically achieved by performing measurements at the UE side, for example, via a received signal strength indicator (RSSI) scan, and the ranks of the cells based on the received signal strength. In other words, in the conventional cell-centric network, the network instructs the UE to connect to the BS (or a BS to send a signal to the UE indicating a connection) that provides the highest SINR for the individual UE. Such a mechanism is more or less effective in the conventional cell centric network, because a UE, when receiving a relatively higher signal from one BS is unlikely to receive high interference from another BS, because the distances between the interfering BS and the UE are sufficiently large due to the large cell size, therefore the interference power is sufficiently small due to path loss.

In a device-centric network, where the UEs and BSs are highly densified, a UE has multiple adjacent BSs, and may also be receiving significant interference from the non-serving BSs. As a result, the prior art mechanism of associating a UE to the BS that is nearest, or provides the highest individual SINR, poses a problem in a dense device-centric network, as it may adversely affect any nearby UEs and so degrade the entire network performance.

Figure 1:
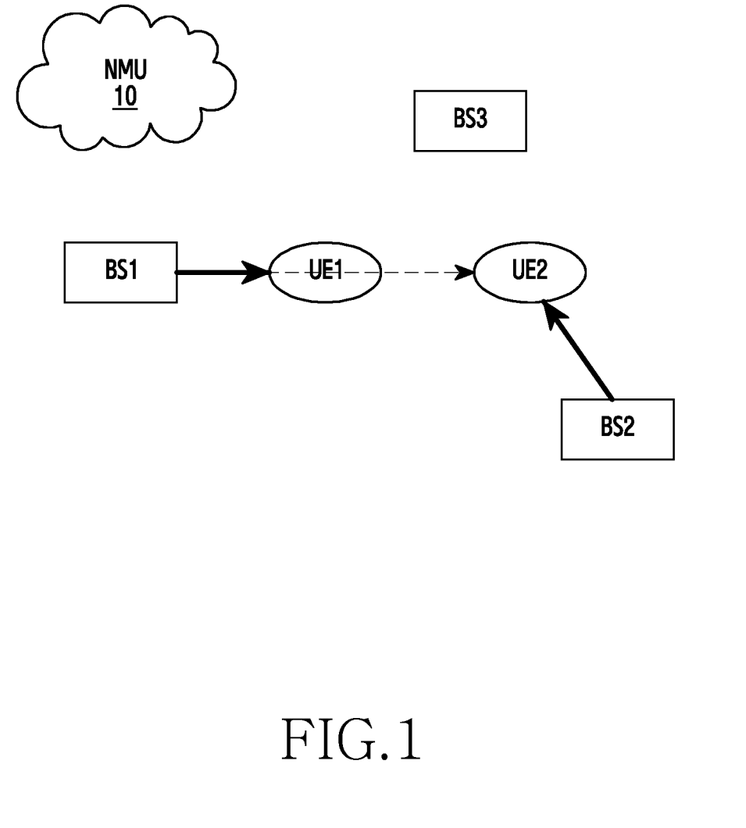
FIGS. 1 and 2 illustrate examples of the problem of a new user equipment (UE) entering a network according to embodiments of the present disclosure.

Using a highly simplified model, the aforementioned problem is illustrated in FIG. 1. In FIG. 1, consider two UEs, a UE1 and a UE2, that have three surrounding BSs. Note that in practice, there could be a great many more the UEs and the BSs, but for the sake of simplicity, this example may suffice. Suppose the UE2 is already connected to a BS2, as illustrated by the thick line. Now, the UE1 enters the network, and is looking for a BS to connect to. Suppose a BS1 provides the highest SINR to the UE1. In the prior art solution, the network would instruct BS1 to send a signal indicating connection with the UE1. In such a circumstance, however, the UE2 receives a relatively high level of interference from the downlink transmission of the BS1, shown by the dotted line, which has the effect of degrading the overall network throughput, because now the SINR of the UE2 has significantly degraded. In other words, although the best choice in terms of maximizing individual SINR for the UE1 is to connect to the BS1, it does not necessarily mean that this is the optimal choice in terms of achieving the maximum throughput for the entire network, which is indicated, for example, by the average throughput of all the UEs in the network. It is also not fair to UE2 that the service the UE2 receives may be disrupted due to the entry of a new UE-UE1. Note that in FIG. 1, the BSs may use beamforming techniques for downlink transmissions.

Figure 2:
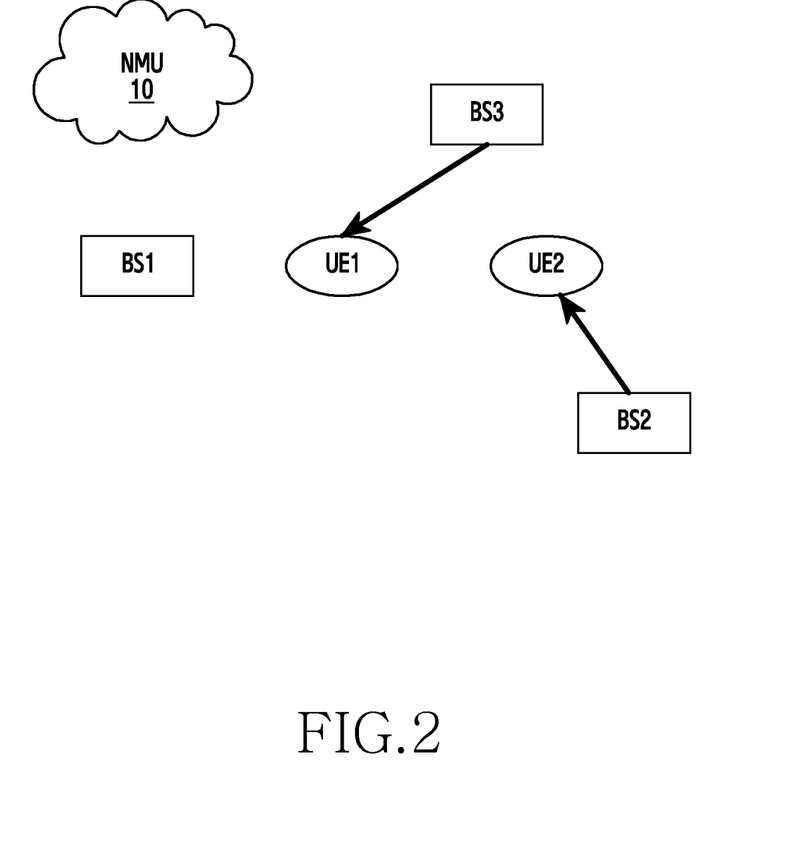

Turning to FIG. 2, which illustrates an alternative scenario. If, instead, a UE1 connects to a BS3, it may not achieve the highest individual SINR (compared to connecting to a BS1). However, as a UE 2 now receives significantly less interference, a higher network throughput can be expected from the overall network perspective. It can be seen that the transmission beams from a BS2 directed to the UE2, and from the BS3 directed to the UE 1 do not overlap, resulting in far lower interference than the scenario illustrated in FIG. 1.

FIGS. 1 and 2 also show the network management unit (NMU) 10, which oversees the operation of the entire network. It may be embodied in one or more of many different forms, depending on the specific network requirements.

The example above shows the problem of UE association in a virtualized device-centric network, where, depending on the locations of, and the channels experienced by, the UEs (in relation to each other and the BSs), there exists a 'best' or, at least, 'better' association mechanism where an optimal throughput of the entire network, rather than just the maximum throughput of an individual UE, can be achieved.

However, obtaining such an optimal solution is non-trivial, especially considering the fact that the network is very dynamic with a large number of UEs entering, leaving, and moving around in the network, in addition to the highly dynamic channels between each BS and UE pair, which makes it extremely difficult to model the environment. Solutions on optimal user association have been looked into, but there are a number of problems when considering application to practical cellular networks. One of the major problems is that the optimization is formulated and solved by considering a static network, i.e., with no changes in locations and activities (e.g. entering or dropping off the network, for instance) of the UEs, or the channels. This is highly impractical as, by the time the optimization algorithm reaches a solution, the network has typically changed so drastically that the solution is no longer optimal.

Although network scheduling can, to some extent, mitigate the interference caused due to simultaneous transmissions, the transmission between BSs to the UEs has to be allocated to different time instants. In 5G, when massive data transmission is required, such a time-division scheduling method will cause delays (therefore higher latency), and require more complicated scheduling mechanisms, which are impractical.

It is also possible, to use coordinated multipoint BS (CoMP) in initial access, where the UE, when entering the network, will determine the 'best' BS to attach to, according to, for example, the resulting instantaneous overall network throughput by connecting to all potential BSs. Such an initial access mechanism has three drawbacks: 1) Every time the UE enters the network, the UE has to try out all possible BS connections in order to tell which connection yields the highest network throughput; 2) the decision of connection is made based on instantaneous knowledge of network throughput. A person skilled in the art will appreciate that such a decision is not optimal in terms of achieving the highest average network throughput (averaged over time); 3) the complexity of trying out all possible BSs becomes inhibitive, especially in a device-centric network where the number of BSs is high. For example for a network with N BSs, one UE, when entering the network, has to try out all N possible connections (and requires knowledge of all other UE's quality of connection due to this possible connection) in order to make a decision. As the number of BSs increases, this rapidly becomes impractical.

SUMMARY

In some embodiments, a method of managing a telecommunications network comprises obtaining data representing an operational parameter from at least some of the plurality of network elements comprising a plurality of base stations and at least one terminal, determining mapping information for connection between the at least one terminal and the plurality of base station based on the data representing the operational parameter, and transmitting, to the at least one terminal, the mapping information.

In some embodiments, an apparatus for managing a telecommunications network comprises a transceiver and at least one processor operatively coupled with the transceiver. The at least one processor is configured to control to obtain data representing an operational parameter from at least some of the plurality of network elements comprising a plurality of base stations and at least one terminal, determine mapping information for connection between the at least one terminal and the plurality of base station based on the data representing the operational parameter, and transmit, to the at least one terminal, the mapping information.

Embodiments of the present disclosure aim to address shortcomings in the prior art, whether mentioned herein or not.

According to the present disclosure there is provided an apparatus and method as set forth in the appended claims. Other features of the disclosure will be apparent from the dependent claims, and the description which follows.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged network configuration.

According to an embodiment of the present disclosure, there is provided an optimal base station (BS)/user equipment (UE) association mechanism using an online learning algorithm, where the UEs, observing and learning from the environment and their past experience, gradually tune their behaviors, such that over time, the average network throughput is optimized. The optimal state is achieved by using machine learning. In particular, a Q-learning mechanism, which explores the study and construction of algorithms that can learn from the environment, is provided.

Machine learning has been proven to be extremely useful in certain areas such as pattern recognition. However, the use of the machine learning in the field of cellular networks has not been widely adopted, if at all. 5G networks are becoming increasingly dynamic and it is envisaged that will continue to expand in many vertical dimensions, including, for example, vehicular communications and industrial automation. Such expansion makes it difficult to model the environment and traffic in 5G networks and it is therefore not possible to formulate optimization problems using conventional tools or techniques. Machine learning, however, is found to provide an efficient way of optimizing performance, without the need to extensively model the environment.

Note that throughout this application, average network throughput is only given as an example to indicate the network quality. Persons skilled in the art would readily understand that such a network quality metric can be in various different forms, such as network capacity, coverage (probability of), average SINR, QoS etc.

Embodiments of the disclosure utilize a method of BS/UE association in a dense cellular network, such that the average network throughput is maximized or optimized. The method comprises obtaining location and data representing perceived performance (SINR/throughput) of the mobile devices, and executing a network management algorithm that uses at least the data representing perceived performance and data representing current throughput of the network as inputs, and dynamically providing instruction to the mobile devices in terms of which BSs to be associated with, based on an output of the network management algorithm.

The network management algorithm is based on a Q-learning technology. It learns and instructs the mobile devices online according to the changing environment, for example, the locations and transmission beams of the UEs, the channels between a UE and BSs, as well as the random path loss and noises, such that maximum throughput of the entire network can be achieved over time.

A goal of the network management algorithm set out herein is to be able to tell the UE which BS to associate with, given the current and past environment, including the location of the UEs and BSs existing in the network, the random channels and path losses and the beams used by the UEs to transmit their data, such that the maximum throughput of the entire network is achieved.

As an example of a mode of operation of an embodiment of the disclosure, there are several steps involved: (1) Although the present disclosure has been described with an exemplary embodiment, various changes and modifications may be suggested to one skilled in the art. It is intended that the present disclosure encompass such changes and modifications as fall within the scope of the appended claims. The network collects data from the past UEs' experience. Examples of such data include the locations, beam patterns used for transmission, and the achieved throughput of individual UE (which requires the UEs to feedback this information to the network); (2) Each UE feedbacks such data to a central network management unit (NMU) as input to the network management algorithm; and (3) The network management unit (NMU) runs the algorithm, and outputs an 'action' to the UE which, here, is specifically to instruct the UE which BS it may associate with. In some embodiments, the NMU transmits the mapping information for connection between the UEs and the BSs in the network to the UEs.

As an example, consider a scenario where there is a network with four BSs, namely BS1 to BS4. In addition there are three UEs, namely a UE1 to a UE3, that are associated with a BS1 to BS3, respectively. Consider the case when a new UE enters the network and an embodiment of the disclosure uses the network management algorithm to tell the new UE which a BS to connect to. In an exhaustive search method, referred to previously, the UE could try to connect to each of the available BS and obtain the network throughput in each case, then decide which the BS the UE may connect to. Such a heuristic method is problematic in practical cellular networks, due to the unbearable latency, overhead, and switches of connection, not to mention that by the time a decision is made, the environment may have changed so dramatically that the optimal connection obtained from the past experience may not be optimal any more.

In an embodiment of the present disclosure, first data is collected including the locations, beam patterns used for transmission, and the achieved throughput of the individual UE. In particular, the achieved throughput of each individual UE (for example the $i^{th}$ UE), is considered as a function of the SINR received by this UE, given by:

$$R_i = B\log(1 + SINR_i)$$
$$\text{where } SINR_i(\mathcal{L}_{BS}, \mathcal{L}_{UE}, \mathcal{B}, \mathcal{P}, \mathcal{H}) = \frac{P_r + G_{BF} - PL}{I + N}.$$

where

In the equation above, $P_t$ is the downlink transmission power, $G_{BF}$ is the beamforming gain, resulted from using a given beam pattern specified in a codebook, and PL is the path loss, which is a random variable and a function of the relative locations between the UE and the serving BS. In addition, SINR of an individual UE is a function of $\mathcal{L}_{BS}$, $\mathcal{L}_{UE}$, $\mathcal{B}$, $\mathcal{P}$, $\mathcal{H}$ which are the locations of the BSs, the locations of the UEs, the beam patterns applied to each BS-UE pair, the path loss components, and the channels, respectively, which are all dynamically changing (expect for the BS locations) and are treated as random variables.

In addition, the noise term in the equation above is given by:

$$N = KTB$$

where K is the Boltzmann constant, T is the noise temperature, and B is the bandwidth.

Furthermore, the interference term I is given by aggregating the received signal from the interfering BSs, given by:

$$I = \sum_{\substack{n=1 \\ n \neq i}}^{N} P_r.$$

As a result, in step 1 of the procedure set out above, throughput $R_i$ for each UE is collected, as a function of: Locations of the BSs; Locations of the UEs (Randomly distributed); Beam patterns used for the UEs; Path loss between UE and the BSs; and Channel between UE and the BSs.

Figure 3:
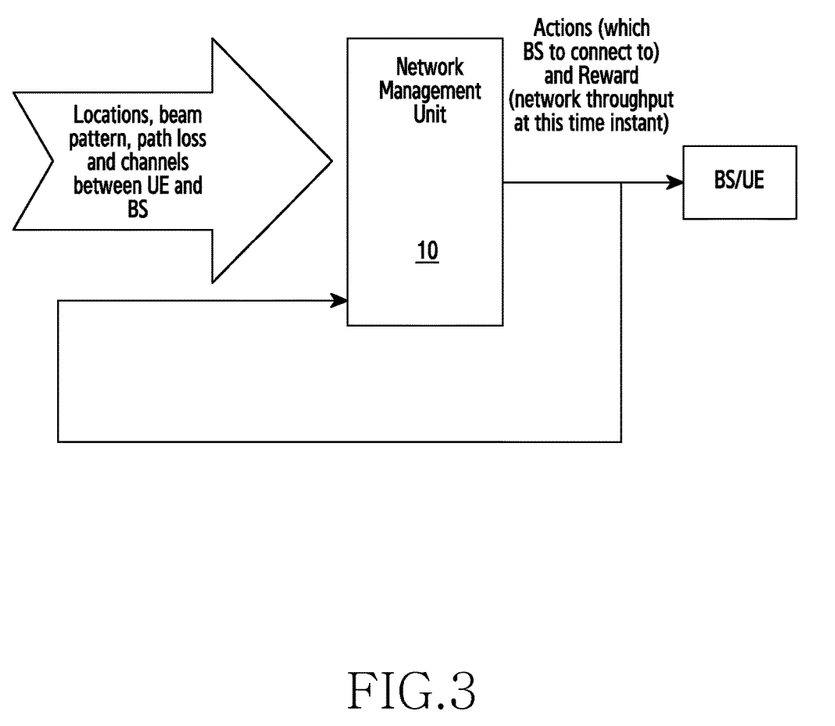
FIG. 3 illustrates an example approach according to embodiments of the present disclosure.

These parameters all together are considered as inputs to the network management unit, which is illustrated conceptually in FIG. 3. This shows that the inputs referred to above are supplied to the Network management unit NMU 10. The NMU is a central network entity which provides management functionality and oversees the association of UEs with BSs. The NMU 10 may take the form of one or more known network components. Its functionality may (at least partially) resemble what is considered as Node-C (node with cloud computing) in the centralized RAN (C-RAN) concept, or the mobility management entity (MME) in the conventional LTE cellular network. In the following and throughout this application, NMU is intended to relate to one of these known components with the functions described above incorporated into such a unit, or the NMU can be a new network component in a future 5G network.

In the conceptual illustration of FIG. 3, the NMU 10 runs the algorithm and controls the association of the UEs and the BSs by directly messaging the appropriate system entities. In some embodiments, the association of the UEs and the BSs refers to mapping information for connection between the UEs and the BSs in the network. However, the intelligence required to run the algorithm may, in practice, be distributed throughout the network and may reside in one or more network entities, depending on the exact specific requirements of the host network.

As can be seen in FIG. 3, by the feedback path from the BS/UE to the NMU 10, the algorithm gathers information related to the current associations and uses this information to improve future associations.

In step 2, the network management unit performs a Q-learning algorithm, that provides an estimate of the 'reward', i.e., the average throughput of the network at a given time t, according to the actions $\alpha_t$, given by:

$$Q_{t+1} = Q_t + \alpha[R_t - Q_t]$$

where $0 \leq \alpha \leq 1$ is the learning rate, $R_t$ is the immediate award, which here is the immediate network throughput, given the current environment and connection of BS-UE pair, i.e., the actions $\alpha_t$. The actions are defined as a real valued number, indicating which BS to be connected to. For example $\alpha_t=3$ indicates the action of a UE connecting to the third BS.

The actions taken at a given time instant t, is dependent on a parameter $0 \leq \epsilon < 1$. When $\epsilon=0$, the network management unit always takes the optimal action, i.e., the connection that yields the maximum throughput at this time instant, given by:

$$\alpha_t^* = \text{argmax}\{Q_t(\alpha_1), Q_t(\alpha_2), \ldots, Q_t(\alpha_N)\}$$

when $\epsilon \neq 0$, the algorithm would randomly choose one of the actions, therefore the algorithm has a chance to sweep and evaluate all the possible actions, i.e., the so-called phase of exploration.

In step 3, the network management unit outputs the actions taken and instructs the UE/BS to act accordingly.

This procedure is illustrated in FIG. 3, where the collected input from step 1 is given as an input to the network management unit 10, and the network management unit 10 performs a Q-learning algorithm (as in step 2), and outputs the actions to a BS or a UE, instructing them regarding the connections to be formed between the BS and the UE. The result of the actions (pattern of connection) when applied to the BS and the UE, in turn affects the current network throughput and the decision on which actions to take in the future, i.e., the next time instance.

The algorithm can be run at the UE side or by the network management unit 10, which is located as part of the core network. Alternatively, the functionality performing the network management algorithm may be distributed throughout the network, as required. More details of this follow later.

In each case, a training (learning) phase is required before the algorithm can output a favorable action in a stable, reliable manner.

The following description will consider the scenario when a new UE enters the network, and the algorithm is running at the network management unit 10.

In the learning phase, UEs at different locations try out different connections to BS. Unlike prior art approaches, they do not exhaustively try out all possible connections, nor do they try to make a 'best' selection at this stage. They may simply randomly select one connection (the so-called 'exploration' in Q-learning terms). The purpose of the training phase is to allow the network to have sufficient knowledge to learn (the so-called 'Exploitation' in Q-learning terms) between the inputs (including Locations of the BSs, Locations of the UEs (Randomly distributed), Beam patterns used for the UEs, Path loss between UE and the BSs, and Channel between UE and the BSs), and output (network throughput at this time instant).

After the learning phase, the network management unit 10 is able to output actions to UEs that maintain a relatively stable (and maximum) average network throughput. In particular, the management unit will, at a given time: (1) Observe the current inputs from the UEs (for example, location and channel information of the new UE); (2) Select and perform an action a for this time instant (in terms of which BS to connect to for the UE), wherein if a randomly generated real valued number $< \epsilon$, then select the action that maximizes the instantaneous network throughput of all UEs ('exploitation'), Otherwise, randomly make a selection ('exploration'); (3) Receive an immediate 'reward' for this time instant $R_t$ (in this case, this is the network throughput due to the selected action); and (4) Compute average network throughput for the next time instant $Q_{t+1}$, which is used for determining an action for the next time instant.

Figure 7:
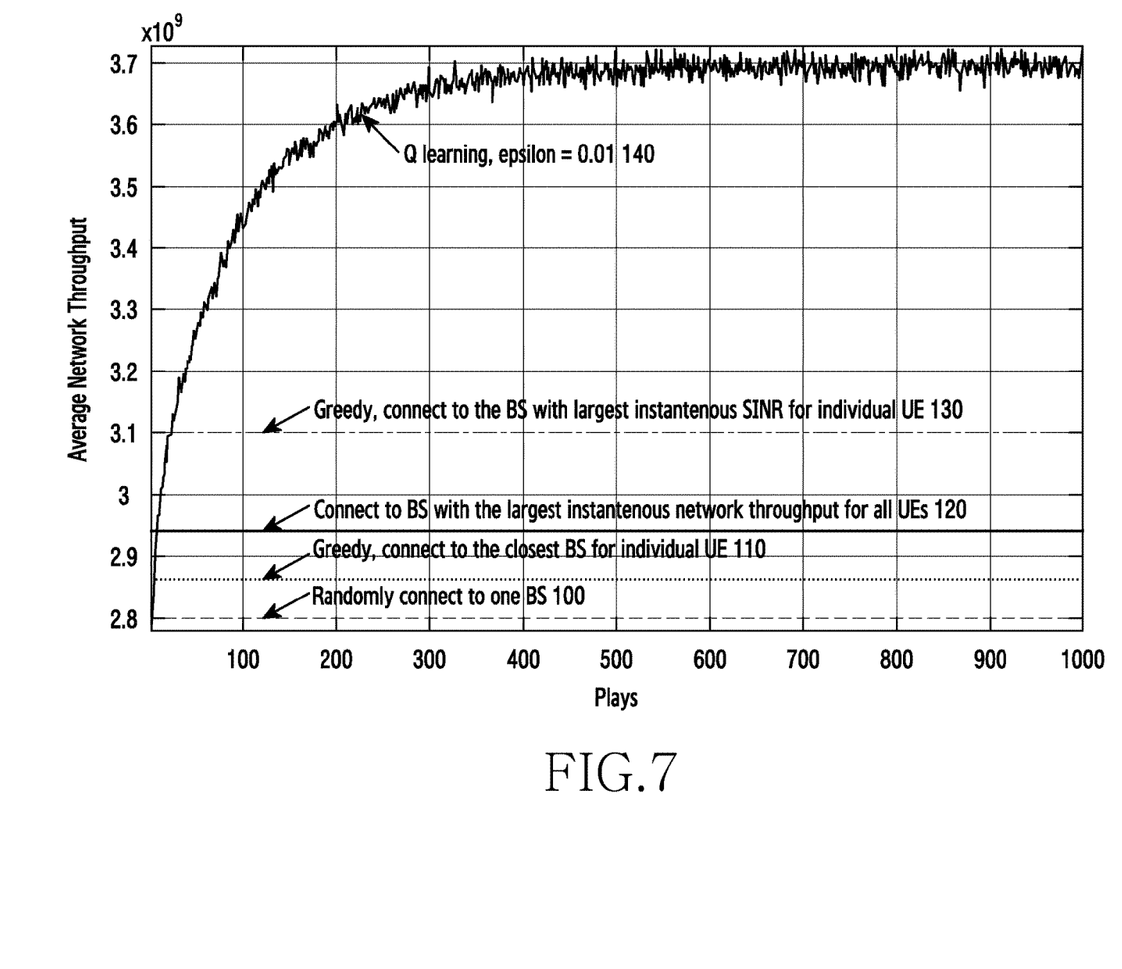
FIG. 7 illustrates an example comparative result according to embodiments of the present disclosure.

An example of the above procedure in a network protocol is illustrated in FIG. 7, where the UEs update their respective information, report their respective information to the BS, which is in turn provided to the network management unit 10 for the BS to perform the learning and further instruct the UE. In the example shown in FIG. 7 the learning phase lasts for about 200 runs (plays), which is a sufficient number to show the overall effect.

Figure 4:
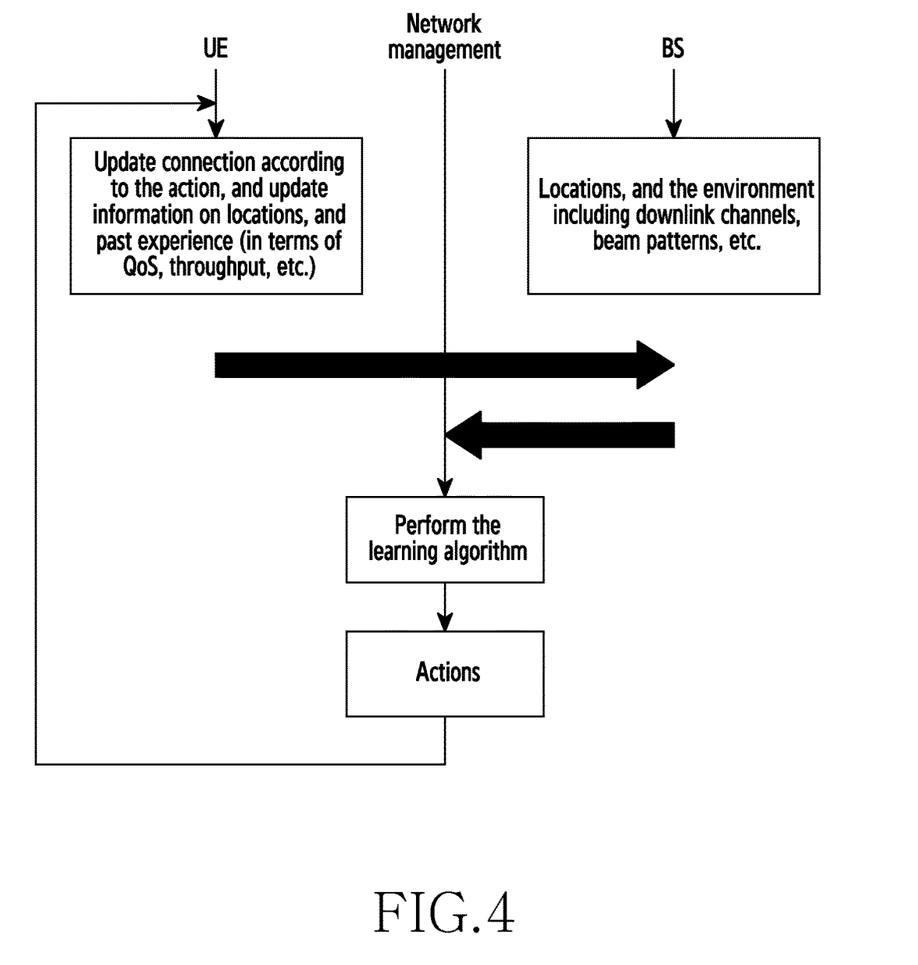
FIGS. 4-6 illustrate example network protocols according to embodiments of the present disclosure.
Figure 5:
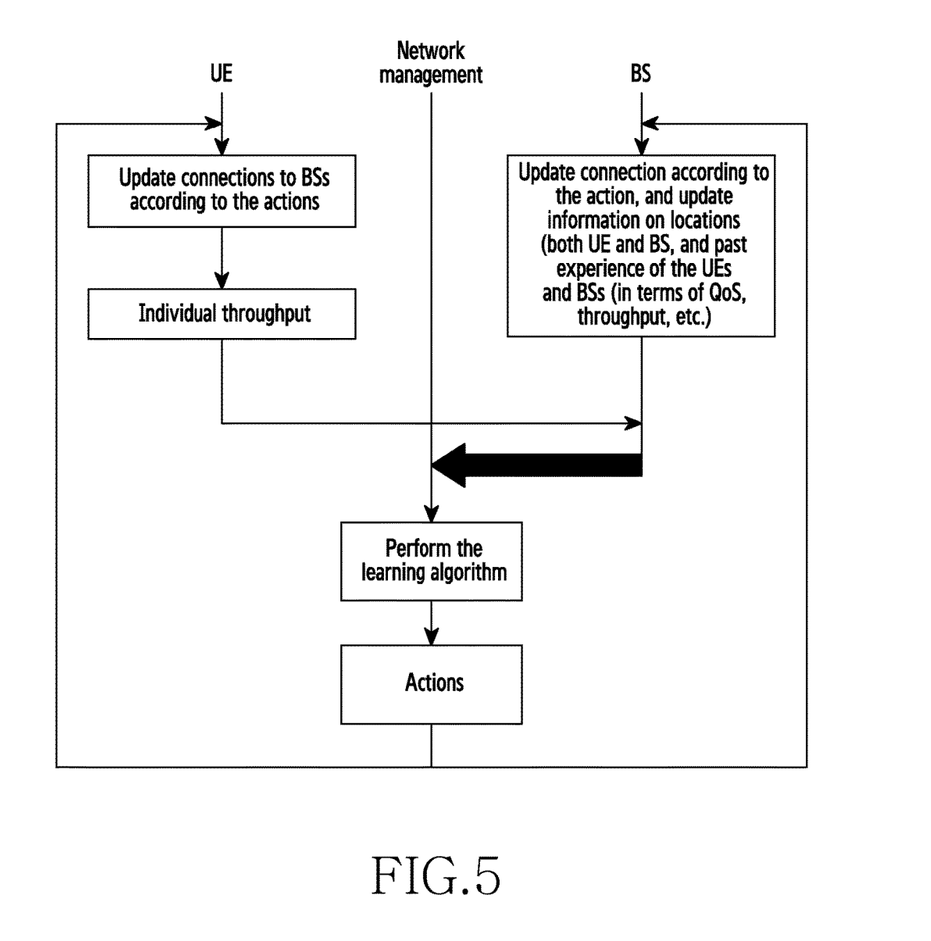
Figure 6:
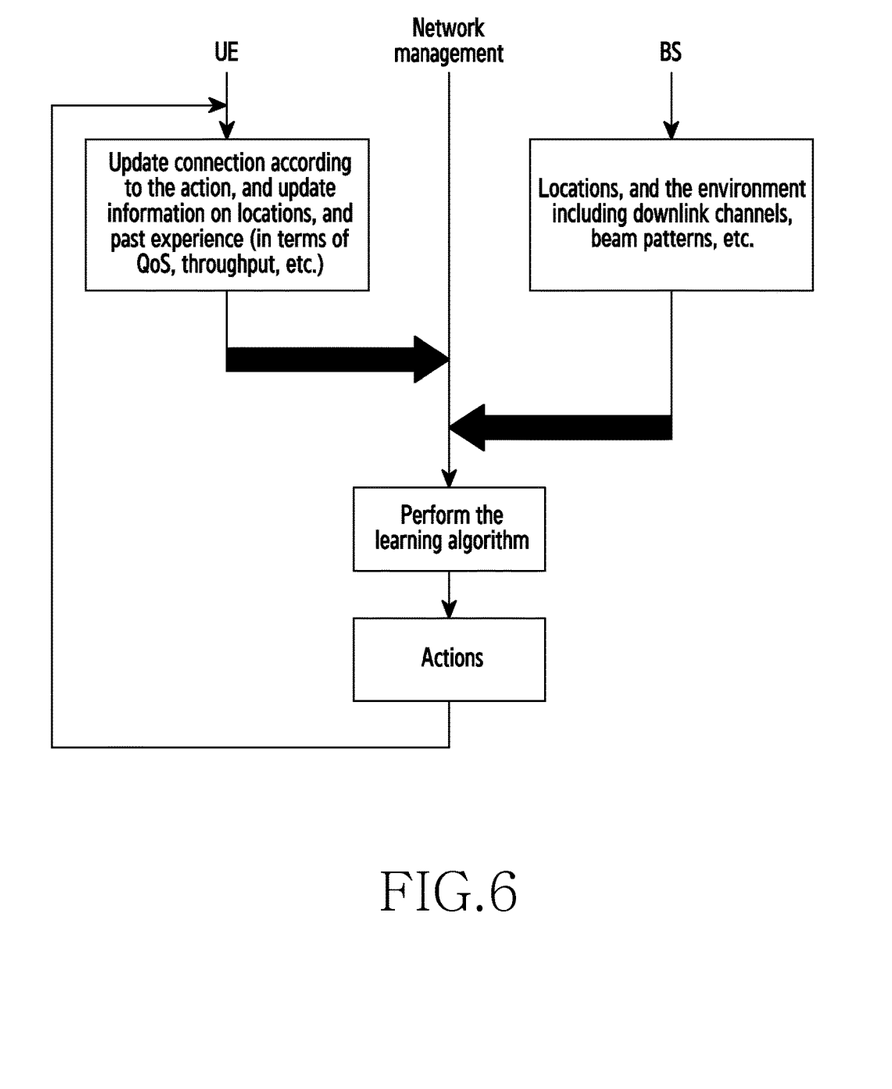

Note that FIG. 7 is just by way of example, and it will be understood that such collection of the environmental parameters could happen at the UE or the BS, and the communications of these parameters could be between the UE and network management unit 10, between BS and network management unit, between the UE and the BS, or between the UE and the UE then eventually to the BS or network management unit 10. These different embodiments of the protocols are illustrated in FIG. 4-6, respectively. The skilled person will appreciate that still other variants may exist, all of which fall within the scope of the claims appended hereto.

FIGS. 4-6 illustrate examples network protocols according to embodiments of the present disclosure.

FIG. 4 illustrates that the UE provides information regarding certain parameters, as set out previously and as shown in the figure to a BS in the network. Note that the BS used to communicate with at this stage is not necessarily the BS with which the UE will eventually associate; it is merely a conduit to allow the UE to pass information to the network.

The BS supplements the information provided by the UE with further information required for the NMU to perform the learning algorithm I,e, locations and the environment, including downlink channels, beam pattern etc.

The complete information is then sent by the BS to the NMU, which performs the learning algorithm, which produces one or more actions, chiefly an instruction for the UE wishing to enter the network to associate with a selected BS, namely the BS which will optimize network throughput, as determined by the learning algorithm.

There are two inputs to the algorithm processing: UE inputs and BS inputs. FIGS. 4 to 6 illustrate different combinations of inputs and signaling required.

FIG. 4 illustrates how UE inputs (locations for example) are sent to the BS, aggregated with BS inputs, then send to NMU for processing. In this example, therefore, the NMU does the computation of the intermediate result and then performs the learning algorithm.

FIG. 5, in contrast, illustrates how, using the inputs from the UE, the UE computes an intermediate result (throughput), sends that intermediate result to the BS, where the BS aggregates the intermediate result with BS inputs which are then sent to the NMU for processing, followed by the NMU performing the learning algorithm.

FIG. 6 illustrates how both inputs from the UE and from one or more BSs are sent to the NMU to process. One difference between the example of FIG. 4 and FIG. 6 is that the BS in FIG. 4 acted merely as a means to relay information which is ultimately transmitted to the NMU.

The example configurations shown here highlight that different signaling and reporting approaches may be adopted, while still gaining from improvements offered by embodiments of the present disclosure. The different approaches adopted here each require a different network protocol, but all conform to the inventive concept.

In a further example, the UEs may share their experience and environment parameters, via, for example, device-to-device (D2D) communications, which can be used in another UE as the samples (inputs) to the network management unit 10. In such a case UE1 may be learning from a UE2's past experience, as if the UE1 has experienced such an environment before. In this way, the entire network is able to benefit from the experience of all devices in the network.

The hardware capabilities of devices may vary. For example, the UE1 may need to collect environment/data information and perform the learning, whereas the UE2 may only be sharing the UE2's experience and receiving instructions.

Performance of the algorithm according to an embodiment of the disclosure is presented in FIG. 7, which shows results for the following scenarios, where the average network throughput over time (plays) are obtained by: (1) connecting to one of the BSs randomly (100); (2) always connecting to the BS that is closest to the UE (110); (3) always connecting to the BS that provides the highest instantaneous network throughput for all UEs (120); (4) always connecting to the BS that provides the highest instantaneous SINR for the individual UE (130); and (5) via Q-learning (140).

As seen from FIG. 7, there a clear advantage in terms of enhanced average network throughput when the proposed learning algorithm is applied, where the end network throughput using Q learning is shown to have about 16% increase, compared to that using the conventional highest SINR criterion. The model used to create the results shown in FIG. 7 uses an example of a network with four BSs and four UEs, where the locations of BSs are fixed whereas the locations of UEs are random. Typical practical network configurations will differ widely, but this gives a clear indication of the level of improvement which can be achieved using an embodiment of the disclosure.

Embodiments of the disclosure offer several advantages over prior art solutions. In particular, they offer enhanced performance, in terms of network throughput (considering the whole network). This allows less infrastructure to handle the same data traffic, or conversely to offer increased performance using the same number of base stations. This is derived from the ability to facilitate online learning and agile adaption in a highly dynamic environment, such as that prevalent in a 5G setting. Embodiments of the disclosure also allow online control of the initial access of a plurality of UEs, without the need to model the environment and wherein the control of the network is adapted accorded to the changing nature of the network, in terms of UEs and BSs.

Prior art solutions only consider static network conditions, which does not work when the environment and make up of the network changes dynamically and rapidly.

By making use of machine learning, such as Q-learning, it is possible to allocate resources more effectively and to allow optimal use to be made of finite and precious network resources.

Embodiments of the disclosure permit enhanced performance of the network through dynamic association of the small cells from the UEs, wherein said association is managed by means of machine learning as set out previously.

Embodiments of the disclosure may also be used in a heterogeneous network where Macro BS and small cell BSs are included. The technique therefore also provides a method of switching between macro BS and small cell BS association. As an example, embodiments of the disclosure can be used to instruct a UE whether to connect to a macro BS or a small cell BS according to the network environment.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

What is claimed is:

1. A method of managing a communication network, the method comprising:
   receiving first data including at least one instantaneous throughput and at least one location of at least one terminal, and second data including locations, beam patterns and channels of a plurality of base stations, the second data is from the plurality of base stations;
   identifying at least one base station among the plurality of base stations that the at least one terminal is to connect with, based on the first data and the second data; and
   transmitting, to each of the at least one terminal, information indicating the identified at least one base station,
   wherein identifying the at least one base station that the at least one terminal is to connect with comprises:
      if a randomly generated real valued number is smaller than a pre-defined value, identifying at least one base station among the plurality of base stations that the at least one terminal is to connect with such that an instantaneous network throughput of all terminals is maximized; and
      if the randomly generated real valued number is larger than or equal to the pre-defined value, randomly selecting at least one base station among the plurality of base stations that the at least one terminal is to connect with.

2. The method of claim 1, wherein identifying of the at least one base station comprises determining to maximize an average throughput for the communication network which is summed from the at least one instantaneous throughput for the at least one terminal rather than an individual instantaneous throughput for the at least one terminal.

3. The method of claim 1, further comprising:
   performing a training of the communication network,
   wherein the training comprises an iterative process in which a reward is computed according to an immediate action, and
   wherein the reward is used to determine a next action in which a particular network element takes.

4. The method of claim 1, wherein the at least one base station is identified based on a machine learning algorithm which is provided with the first data and the second data from previous experience, and
   wherein the machine learning algorithm is a Q learning algorithm.

5. The method of claim 3, wherein the next action is determined by at least one of a terminal, a base station, or by a network management unit.

6. The method of claim 5, wherein the first data is transmitted from the at least one terminal to the plurality of base stations, aggregated with the second data from the plurality of base stations, and then transmitted to the network management unit for processing, and
   wherein an intermediate result is computed and a machine learning algorithm is performed by the network management unit.

7. The method of claim 5, wherein an intermediate result is computed by the at least one terminal, transmitted from the at least one terminal to the plurality of base stations, and then aggregated with the second data from the plurality of base stations that are transmitted to the network management unit for processing, and
   wherein a machine learning algorithm is performed by the network management unit.

8. The method of claim 5, wherein the first data from the at least one terminal and the second data from the plurality of base stations are transmitted to the network management unit, and
   wherein a machine learning algorithm is performed by the network management unit.

9. The method of claim 1, wherein the at least one terminal comprises a first terminal and a second terminal,
   wherein the at least one base station comprises a first base station and a second base station,
   wherein identifying the at least one base station comprises identifying the second base station as a serving base station for the first terminal, if interference to the second terminal calculated based on the first data and the second data causes a maximum throughput for the communication network to degrade after the first terminal is connected to the first base station.

10. The method of claim 1, wherein the at least one base station is identified based on a second average throughput of the communication network at a second time, and
    wherein the second average throughput is determined based on a first average throughput of the communication network at a first time, a learning rate indicating how much a difference value is applied to the second average throughput,
    wherein the difference value is determined based on the first average throughput and an instantaneous throughput of the at least one terminal at the first time, and
    wherein the first time is in advance to the second time.

11. An apparatus for managing a communication network, the apparatus comprising:
    a transceiver; and
    at least one processor operatively coupled with the transceiver,
    wherein the at least one processor is configured to:
       receive first data including at least one instantaneous throughput and at least one location of at least one terminal, and second data including locations, beam patterns and channels of a plurality of base stations, the second data is from the plurality of base stations,
       identify at least one base station among the plurality of base stations that the at least one terminal is to connect with, based on the first data and the second data, and
       transmit, to each of the at least one terminal, information indicating the identified at least one base station,
    wherein to identify the at least one base station that the at least one terminal is to connect with, the at least one processor is further configured to:
       if a randomly generated real valued number is smaller than a pre-defined value, identify at least one base station among the plurality of base stations that the at least one terminal is to connect with such that an instantaneous network throughput of all terminals is maximized, and
       if the randomly generated real valued number is larger than or equal to the pre-defined value, randomly select at least one base station among the plurality of base stations that the at least one terminal is to connect with.

12. The apparatus of claim 11, wherein the at least one processor is further configured to determine maximizing an average throughput for the communication network which is summed from the at least one instantaneous throughput for the at least one terminal rather than an individual instantaneous throughput for the at least one terminal.

13. The apparatus of claim 11, wherein the at least one processor is further configured to perform a training of the communication network,
   wherein the training comprises an iterative process in which a reward is computed according to an immediate action, and
   wherein the reward is used to determine a next action in which a particular network element takes.

14. The apparatus of claim 11, wherein the at least one base station is identified based on a machine learning algorithm which is provided with the first data and the second data from previous experience, and
   wherein the machine learning algorithm is a Q learning algorithm.

15. The apparatus of claim 13, wherein the next action is determined by at least one of a terminal, a base station, or by a network management unit.

16. The apparatus of claim 15, wherein the first data is transmitted from the at least one terminal to the plurality of base stations, aggregated with the second data from the plurality of base stations, and then transmitted to the network management unit for processing, and
   wherein an intermediate result is computed and a machine learning algorithm is performed by the network management unit.

17. The apparatus of claim 15, wherein an intermediate result is computed by the at least one terminal, transmitted from the at least one terminal to the plurality of base stations, and then aggregated with the second data from the plurality of base stations that are transmitted to the network management unit for processing, and
   wherein a machine learning algorithm is performed by the network management unit.

18. The apparatus of claim 15, wherein the first data from the at least one terminal and the second data from the plurality of base stations are transmitted to the network management unit, and
   wherein a machine learning algorithm is performed by the network management unit.

19. The apparatus of claim 11, wherein the at least one terminal comprises a first terminal and a second terminal,
   wherein the at least one base station comprises a first base station and a second base station,
   wherein to identify the at least one base station, the processor is further configured to identify the second base station as a serving base station for the first terminal, if interference to the second terminal calculated based on the first data and the second data cause a maximum throughput for the communication network to degrade after the first terminal is connected to the first base station.

20. The apparatus of claim 11, wherein the at least one base station is identified based on a second average throughput of the communication network at a second time, and
   wherein the second average throughput is determined based on a first average throughput of the communication network at a first time, a learning rate indicating how much a difference value is applied to the second average throughput,
   wherein the difference value is determined based on the first average throughput and an instantaneous throughput of the at least one terminal at the first time, and
   wherein the first time is in advance to the second time.

* * * * *